United States Patent Office 3,269,899
Patented August 30, 1966

3,269,899
SULFURYL CHLOROFLUORIDE FUMIGANT
George T. Parker, Boonton Township, Morris County, N.J., assignor to Allied Chemical Corporation, New York, N.Y., a corporation of New York
No Drawing. Filed June 11, 1964, Ser. No. 374,280
2 Claims. (Cl. 167—39)

This invention relates to an improvement in the control of pests by fumigation.

Although various fumigants have been proposed, there is an acute need for new and better fumigants. An object of this invention is to provide a fumigant which is effective in controlling pests, including the yellow mealworm. Another object is to provide a pesticidal fumigant which is relatively easy to handle, i.e., some fumigant toxicants such as sulfuryl fluoride, must be contained in heavy cylinders because of the high pressures which they create at normal temperatures whereas sulfuryl chlorofluoride can be contained in much lighter cylinders, and relatively effective in small amounts and in shorter periods of time. Other objects and advantages will be apparent hereinafter.

In accordance with the above objects, this invention is directed to a method for combatting pests which comprises subjecting said pest to the action of sulfuryl chlorofluoride.

Sulfuryl chlorofluoride, $SO_2ClF$, melts at $-124.7°$ C.; boils at $+7.1°$ C.; and has a density of 1.623 to 0°C. It has been found effective as a fumigant and useful in combatting insect infestations in flour, grain and other stored products contained in storage bins, grain elevators, and the like, and in combatting other pests.

The preferred mode of using sulfuryl chlorofluoride as a pesticidal fumigant is to enclose the area to be fumigated and expose such areas to the compounds, which permeates the atmosphere. Since the vapor is heavier than air, it tends to sink to the bottom of the bin or elevator, penetrating the flour or grain as it settles. The compound may be introduced into the area by spraying from a pipe or can be stored under pressure in a container, e.g., an aerosol bomb, in the enclosed area in such a manner that sufficient amounts of the gaseous compounds are released into the enclosed atmosphere as desired. Small amounts of sulfuryl chlorofluoride, about 5 ounces or less per one thousand cubic feet are effective. The upper limit is not restricted except by the bounds of practicality. The preferred range is about 16 oz. per 1,000 cu. ft. to about 32 oz. per 1,000 cu. ft Sulfuryl chlorofluoride can also be introduced into the enclosed area by evaporating a solution of the gas in a volatile solvent such as acetone or carbontetrachloride. The sulfuryl chlorofluoride material can also be combined with other fumigant toxicants such as chloropicrin, ethylene bromide, and ethylene chloride, or it can be dissolved in a volatile solvent together with other gaseous or liquid toxicants. When the gaseous material is incorporated into a volatile solvent, the solution can be placed in an open container or on an absorbent such as cellucotton in the enclosed area.

The exposure time required depends upon the size of the enclosed area and the type of material, e.g., flour or grain, in the area, the size of the enclosed area and type of material effecting the time necessary for the fumigant to permeate the area in the proportions set forth above. In an area of 1,000 cubic feet, the time generally required for adequate fumigation is from about 8 hours to about 24 hours. In larger areas such as a typical grain elevator, desirable fumigation times may be about 24 to 36 hours.

The following examples illustrate the present invention. Example I shows the results of tests relating to the application of sulfuryl chlorofluoride in the control of the confused flour beetle and black carpet beetle larvae.

Example II is a comparison of the compound of the present invention and the most closely related prior art compound, sulfuryl fluoride, showing the effect of both compounds on the yellow mealworm, an insect which is a common pest of stored products such as wheat and cornmeal. As shown by the data in Example II, sulfuryl chlorofluoride, the compound used as a pesticidal fumigant in the present invention shows unexpected effectiveness in the destruction of the yellow mealworm as compared to the most closely related compound, sulfuryl fluoride.

Example III is a comparison of sulfuryl chlorofluoride and sulfuryl fluoride showing sulfuryl chlorofluoride as more effective in a shorter exposure period than sulfuryl fluoride.

EXAMPLE I

Two steel cabinets with doors removed were fitted together to form one chamber with a volume of 31.6 cu. ft. Before fitting the cabinets together, test insects were suspended near the center of the chamber confined in salve tins with perforated lids. The chamber was then sealed with masking tape. Sulfuryl chlorofluoride was introduced through a small opening provided near the top, which was immediately sealed with two layers of tape. The results are shown in Table I.

Table I

| Ounces of sulfuryl chlorofluoride per 1,000 cu. ft. | Exposure period (hours) | Percent mortality, 7 days after exposure | |
|---|---|---|---|
| | | CFB [1] | BCBL [2] |
| 14.1 | 5 | 80 | 100 |
| 5.0 | 16 | 100 | 100 |
| 7.2 | 16 | 100 | |
| 9.7 | 16 | 100 | 100 |

[1] CFB = Confused Flour Beetle.
[2] BCBL = Black Carpet Beetle Larvae.

EXAMPLE II

The same procedure was followed as in Example I. The results are shown in Table II. Sulfuryl chlorofluoride is designated as Fumigant (1) and sulfuryl fluoride is designated as Fumigant (2).

Table II

| Fumigant | Ounces/1,000 cubic feet | Exposure period (hours) | Percent mortality, 7 days after exposure YMW[1] |
|---|---|---|---|
| (1) | 8.3 | 5 | 100 |
| (2) | 8.3 | 5 | 0 |
| (1) | 14.1 | 5 | 100 |
| (2) | 13.8 | 5 | 0 |
| (1) | 5.0 | 16 | 100 |
| (2) | 5.8 | 16 | 0 |

[1] YMW = Yellow Mealworm.

EXAMPLE III

The same procedure was followed as in Examples I and II. The results are shown in Table III.

Table III

| Fumigant | Ounces/1,000 cubic feet | Exposure period (hours) | Percent mortality, 7 days after exposure | |
|---|---|---|---|---|
| | | | CFB [1] | BCBL [2] |
| (1) | 5.6 | 5 | ---------- | 60 |
| (2) | 4.5 | 5 | ---------- | 0 |
| (1) | 8.3 | 5 | 50 | 80 |
| (2) | 8.3 | 5 | 0 | 10 |

[1] CFB = Confused Flour Beetle.
[2] BCBL = Black Carpet Beetle Larvae.

I claim:
1. A method for combatting insects which comprises subjecting said insects to the action of an effective amount of sulfuryl chlorofluoride.
2. A method for combatting insects which comprises subjecting said insects to the action of an effective amount of sulfuryl chlorofluoride in an enclosed area.

References Cited by the Examiner

Burditt et al.: Journal of Economic Entomology, June 1963, pp. 261 to 265.

JULIAN S. LEVITT, *Primary Examiner.*
JEROME D. GOLDBERG, *Assistant Examiner.*